(12) United States Patent
Laninga et al.

(10) Patent No.: US 7,546,664 B2
(45) Date of Patent: *Jun. 16, 2009

(54) SAFETY TAP HANDLE

(75) Inventors: Alan Jack Johan Laninga, Port Coquitlam (CA); Jack Anthony Laninga, Maple Ridge (CA)

(73) Assignee: Chrislan Ceramics and Glassware Decorating, Inc., Maple Ridge (CA)

( * ) Notice: Subject to any disclaimer, the term of this patent is extended or adjusted under 35 U.S.C. 154(b) by 127 days.

This patent is subject to a terminal disclaimer.

(21) Appl. No.: 11/525,621

(22) Filed: Sep. 21, 2006

(65) Prior Publication Data

US 2007/0011849 A1    Jan. 18, 2007

Related U.S. Application Data

(63) Continuation of application No. 10/750,074, filed on Dec. 31, 2003, now Pat. No. 7,137,535.

(51) Int. Cl.
*A45C 3/00* (2006.01)
*E05B 1/00* (2006.01)

(52) U.S. Cl. .......................................... 16/436; 16/441

(58) Field of Classification Search ................... 16/436, 16/430, 441, 412, 414, 415, 417; 222/153.03, 222/153.14, 146.6, 153.01, 399, 400.7, 400.8, 222/509; 137/383–385; 74/473.29, 470, 74/523, 557
See application file for complete search history.

(56) References Cited

U.S. PATENT DOCUMENTS

| 541,831 | A | | 7/1895 | Beyerlein | |
|---|---|---|---|---|---|
| 1,186,234 | A | * | 6/1916 | Sanderson | 292/352 |
| 1,225,865 | A | | 5/1917 | Schnelble | |
| 1,609,724 | A | * | 12/1926 | Kendall | 16/441 |
| 1,644,630 | A | * | 10/1927 | Binkele | 16/433 |
| 2,070,952 | A | | 2/1937 | Mitchel | |
| 2,073,986 | A | | 3/1937 | Dannenberg et al. | |
| 2,183,840 | A | | 12/1939 | Kearns | |
| 2,285,963 | A | * | 6/1942 | Gits et al. | 264/247 |
| 2,295,468 | A | | 9/1942 | Haley | |
| 2,631,393 | A | | 3/1953 | Hetherington | |
| 3,286,385 | A | | 11/1966 | Tate, Jr. | |
| 3,620,905 | A | | 11/1971 | Ahramjian | |
| 3,819,779 | A | * | 6/1974 | Pharris et al. | 264/45.5 |
| 3,826,629 | A | | 7/1974 | Pryor et al. | |
| 3,852,148 | A | | 12/1974 | Pryor et al. | |
| 4,159,102 | A | | 6/1979 | Fallon et al. | |
| 4,340,226 | A | | 7/1982 | Haines | |
| 4,492,129 | A | * | 1/1985 | Hasegawa | 74/473.29 |

(Continued)

FOREIGN PATENT DOCUMENTS

DE    10145434 A1 *    4/2003

(Continued)

*Primary Examiner*—Chuck Y. Mah
(74) *Attorney, Agent, or Firm*—Law Office of Karen Dana Oster, LLC

(57) ABSTRACT

An apparatus is disclosed for a tap handle for beverage dispensing comprising a ceramic, porcelain, or stoneware handle filled with a foam, preferably polyurethane foam which renders the tap handle more resilient and resistant to sharding. Ideally, polymeric diphenylmethane diisocyanate foam is injected into a tap handle shell in liquid form, which solidifies and is capped with a glue, an internally threaded cap, and a protective plastic cap.

23 Claims, 2 Drawing Sheets

U.S. PATENT DOCUMENTS

| | | |
|---|---|---|
| 4,592,947 A | 6/1986 | Hunter et al. |
| 4,664,982 A | 5/1987 | Genovese et al. |
| 4,666,758 A | 5/1987 | Hunter et al. |
| 4,767,664 A | 8/1988 | Oike |
| 4,821,764 A | 4/1989 | Brenez |
| 4,894,647 A | 1/1990 | Walden, Jr. et al. |
| 5,291,378 A | 3/1994 | Stone |
| 5,412,547 A | 5/1995 | Hornblad et al. |
| 5,437,898 A | 8/1995 | Forry et al. |
| 5,491,617 A | 2/1996 | Currie |
| 5,586,691 A | 12/1996 | Gotch et al. |
| 5,607,084 A | 3/1997 | George |
| 5,617,977 A | 4/1997 | Augustinus |
| 5,924,784 A | 7/1999 | Chliwnyj et al. |
| 6,591,524 B1 | 7/2003 | Lewis et al. |
| 6,648,178 B2 | 11/2003 | Grunewald |
| 2002/0108651 A1 | 8/2002 | Becker |
| 2008/0131633 A1* | 6/2008 | Gumennyy ............ 428/34.7 |

FOREIGN PATENT DOCUMENTS

| | | |
|---|---|---|
| GB | 2323696 A | 9/1998 |
| GB | 2330440 A | 4/1999 |
| GB | 2347993 A | 9/2000 |
| WO | WO 94/04456 A1 | 3/1994 |
| WO | WO 99/33746 A1 | 7/1999 |

* cited by examiner

SAFETY TAP HANDLE

The present application is a continuation of U.S. patent application Ser. No. 10/750,074, filed Dec. 31, 2003, now U.S. Pat. No. 7,137,535. The present application is based on and claims priority from this application, the disclosure of which is hereby expressly incorporated herein by reference in its entirety.

BACKGROUND OF INVENTION

The invention relates to beverage dispensing accessories. More particularly, the invention relates to an improved, strengthened ceramic, hardened foam-filled tap handle having shatter resistant and resilient safety characteristics.

Restaurants, bars, pubs and nightclubs, and other establishments employ pressurized beverage delivery systems where the flow of the beverage, typically beer, is regulated by a tap. The tap is usually mounted on the bar, and is operated by a tap handle which is rotated forward to open a valve in the tap and pour the beverage into a glass. Various types of taps and valves are used. It has become standard in the industry to display the name and often a logo of the brewer on the tap handle associated with the beverage dispensed from that particular tap. Historically, tap handles have been manufactured from wood, resin, plastic and ceramic. Recently ceramic handles have become popular as a high quality accessory which showcases the logo and name of the brewer. Due to strict regulations governing the display of brewers' tradenames, trademarks, and logos in liquor serving establishments, tap handles have become an important advertising medium.

Ceramic tap handles, although popular, are dangerous as they are brittle, and if struck, tend to shatter into sharp edged shards. The lack of strength and durability renders current ceramic handles less cost effective and a liability, as injuries to operators or customers may occur when handles break.

BRIEF SUMMARY OF THE INVENTION

It is an object of the present invention to implement a tap handle that overcomes some of the disadvantages of the prior art.

An object of the present invention is to provide a tap handle with a ceramic shell filled with foam, thereby providing a stronger, shard-resistant tap handle. The foam filling may be capped by a glue plug.

Another object of the present invention is to implement a liquid-injected foam which hardens to provide structural strength to the tap handle shell and includes adhesive properties, and may be used with ceramic, wood, plastic, or resin shells. Advantageously, the foam is a Polyurethane foam (PMDI).

Still another object of the present invention is to provide a method of manufacturing tap handles by firing a ceramic shell, injecting liquid foam into the shell, then injecting glue into the shell to cement an internally threaded ferrule in place.

Further advantages of the invention will become apparent when considering the drawings in conjunction with the detailed description.

DETAILED DESCRIPTION OF THE INVENTION

Figure 1:
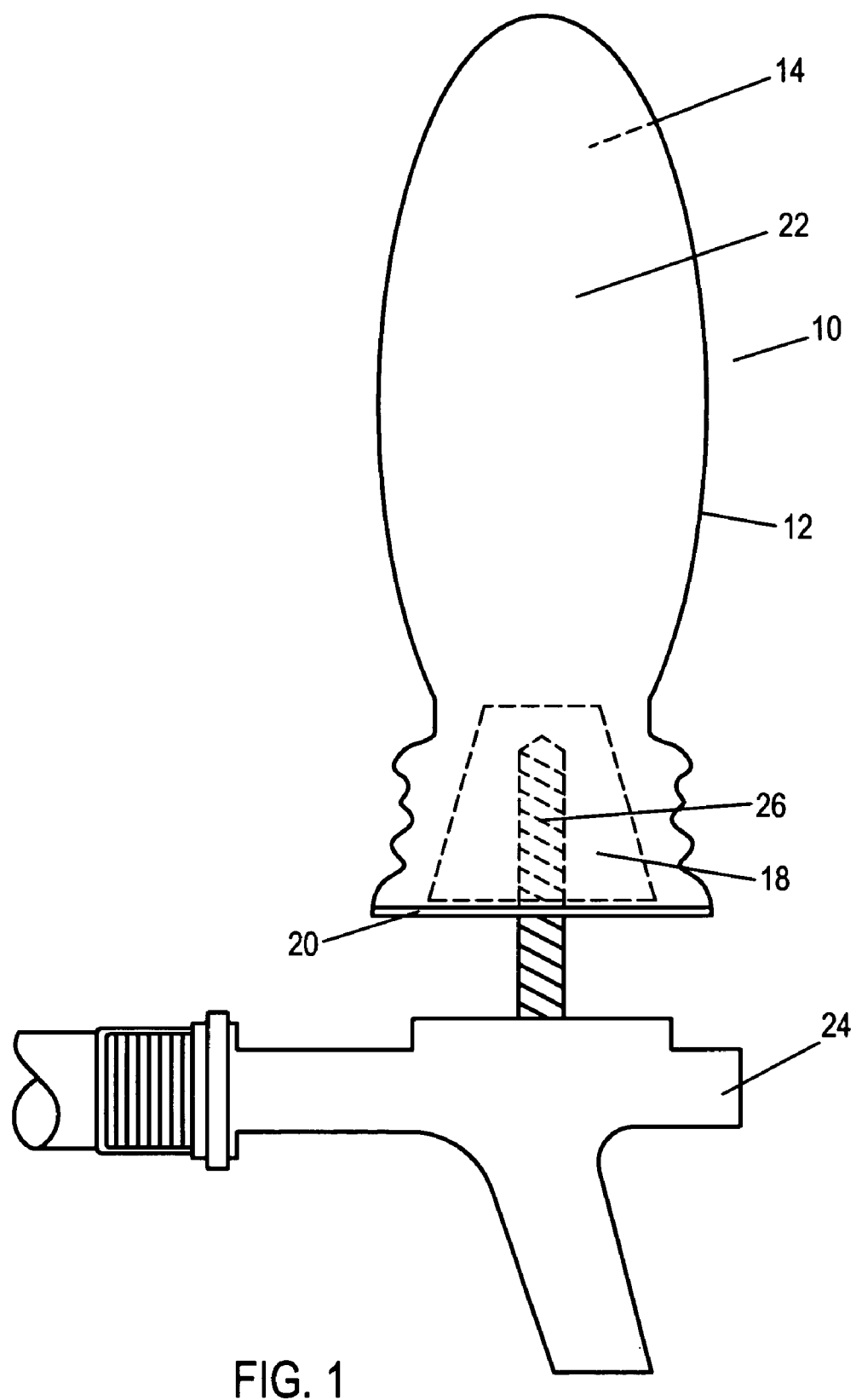
FIG. 1 is a side elevation view of a preferred embodiment of the tap handle that is the subject of the present invention, mounted on a tap.

FIG. 1 depicts an embodiment of the apparatus for an improved safety tap handle 10 used for selectively opening and closing a tap valve on a pressurized beverage system in accordance with the present invention. In general, the tap handle 10 consists of an elongated hollow shell 12 with an open end 11. According to the invention, a hardened foam 14 fills the interior of the shell 12, and the open end 11 is sealed with glue 16 and a threaded ferrule 18. Finally, a plastic cap 20 may be placed on top of the ferrule 18 in the preferred embodiment.

The tap handle 10 is adapted to screw onto a tap 24. Tap handles 10 are distinctive of the brand of beverage being dispensed on the particular tap 24. They, therefore, vary in size, shape, and color, and often bear the tradename, trademark, and logo of a particular beverage supplier such as a brewery. Tap handles 10 are typically elongated structures usually between 30-60 mm (1.2"-2.4") in diameter and 200-300 mm (7.9"-12") in length, sized to fit the hand. It is standard in the beverage dispensing industry for tap handles 10 to include an internally threaded connector or ferrule 18 which mates with a threaded connector, or handle stud 26 projecting upwards from the tap 24, usually attached to a bar. It is standard in the industry that the handle stud 26 is 9.525 mm (⅜") in diameter. The distinctive tap handles 10 are then easily interchangeable between taps 24 when the pressurized beverage delivered to the tap 24 is changed. In operation, the tap handle 10 is typically pulled towards the operator, thereby, opening a valve (not shown) in the tap 24, and dispensing the beverage. Many variations of taps 24 are employed, although the rotational valve version is used by way of example here.

The present invention is an improved tap handle 10, which is strengthened and shard resistant due to a foam 14 injected filling. A ceramic tap handle shell 12 is manufactured from a mold (not shown) which can be of a design distinctive to a particular beverage supplier, typically a brewery. The shell 12 commences as greenware, to which glaze is applied, and distinctive decals are added. The shell 12 is then kiln-fired to produce the hardened shell 12, with the distinctive decals 22 integral to the shell 12. The shell 12 is preferably ceramic stoneware in the preferred embodiment, although it may be porcelain.

Ceramic is desirable as it is an aesthetically pleasing, high quality material recognized in the industry as a premium accessory in beverage equipment. The brittle nature of ceramic results in breakage of tap handles 10 in the busy beverage service environment and can result in injury when the tap handles 10 shard, or shatter into pieces, leaving sharp exposed edges. A foam 14 filling is, therefore, injected into the ceramic shell 12 to overcome these disadvantages.

During manufacturing, the hardened shell 12 is inverted so the open end 11 is at the top. A foam, preferably a polyurethane foam in liquid form, is injected into the shell 12. The foam hardens over a period of 1-2 hours using the preferred material. In variations of the preferred embodiment, other foam products and fillings may be used which fill the interior, such as polystyrene. In the preferred embodiment, RT-5011-A polymeric diphenylmethane diisocyanate (PMDI) polyurethane foam is used to maximize the resulting resilience and anti-sharding qualities of the tap handle 10. The foam 14 ideally contains 58-74% w/w polyether polyol, 22-27% w/w 1,1-dichloro-1-fluoroethane, and 8-12% w/w silicone surfactant in the preferred embodiment, although variations of the constituent ingredients and the percentage composition may be used. Ideally, 70-90% of the shell 12 is filled with foam 14, which is typically to within 20-50 mm of the open end 11 of the shell 12. When the foam 14 has hardened, a liquid glue 16 is injected into the open end 11 of the shell 12, filling the remaining 20-50 mm deep space, to within approximately 2-6 mm from the open end of the shell 12.

In the preferred embodiment, a thermomelt gun is employed with, for instance, thermomelt glue appropriate for bonding to steel and ceramic. Alternatively, an epoxy (e.g. JET™ cure epoxy) may be used. Epoxy, while resulting in a structurally stronger bond between the shell 12, foam 14, and ferrule 18, requires considerable time (usually 24 hours) to cure. (Use of epoxy also requires clamping of the shell 12 during the curing period.) Epoxy may be employed with larger tap handles 10 where the torsion applied to the tap handle 10 during operation requires increased strength. The thermomelt glue is advantageous where careful placement of the ferrule 18 is important for aligning the shell 12 with the tap 24, for instance. The thermomelt glue is also advantageous where speed of production is important, as it hardens in less than 10 minutes, allowing for rapid assembly.

An internally-threaded ferrule 18 is then inserted into the bed of glue 16. An annular plastic washer or cap 20 is then glued over the ferrule 18 to cap the lower end of the tap handle 10 so that glue 16 does not leak out of the open end 11 of the tap handle 10. The cap 20 is optional, and serves to retain the glue plug in place.

In operation, the tap handle 10 is screwed onto the handle stud 26 projecting upwards from the tap 24. The tap handle 10 is pulled forward to pour the beverage (not shown).

The function of the foam 14 is three-fold. Primarily, the foam 14 adheres to the porous interior surface of the shell 12 so that if the tap handle 10 is impacted heavily and breaks, the foam 14 binds the pieces of the shattered shell 12 together, such that the sharp edges of the ceramic are not exposed. Injuries are, thereby, avoided. Secondly, the lightweight foam 14 substantially increases the resilience and strength of the tap handle 10 such that it can withstand substantially greater impacts than prior art handles without breaking. The foam 14 is superior to other materials as it is solid, but compacts under impact, thereby reducing the chance of fracture of the shell 12 as the foam 14 decelerates impacting forces over a greater period of time than a more brittle material. This increases the durability of tap handles 10 and is more cost effective. Finally, the inherent adhesive qualities of the foam 14 act to cement the tap handle 10 into a single unit, including the shell 12, glue plug 16, ferrule 18, and cap 20. The present invention, thereby, renders high quality ceramic tap handles 10 as or more durable and safe than alternative, less aesthetically pleasing handles made from wood, plastic or resin.

Figure 2:
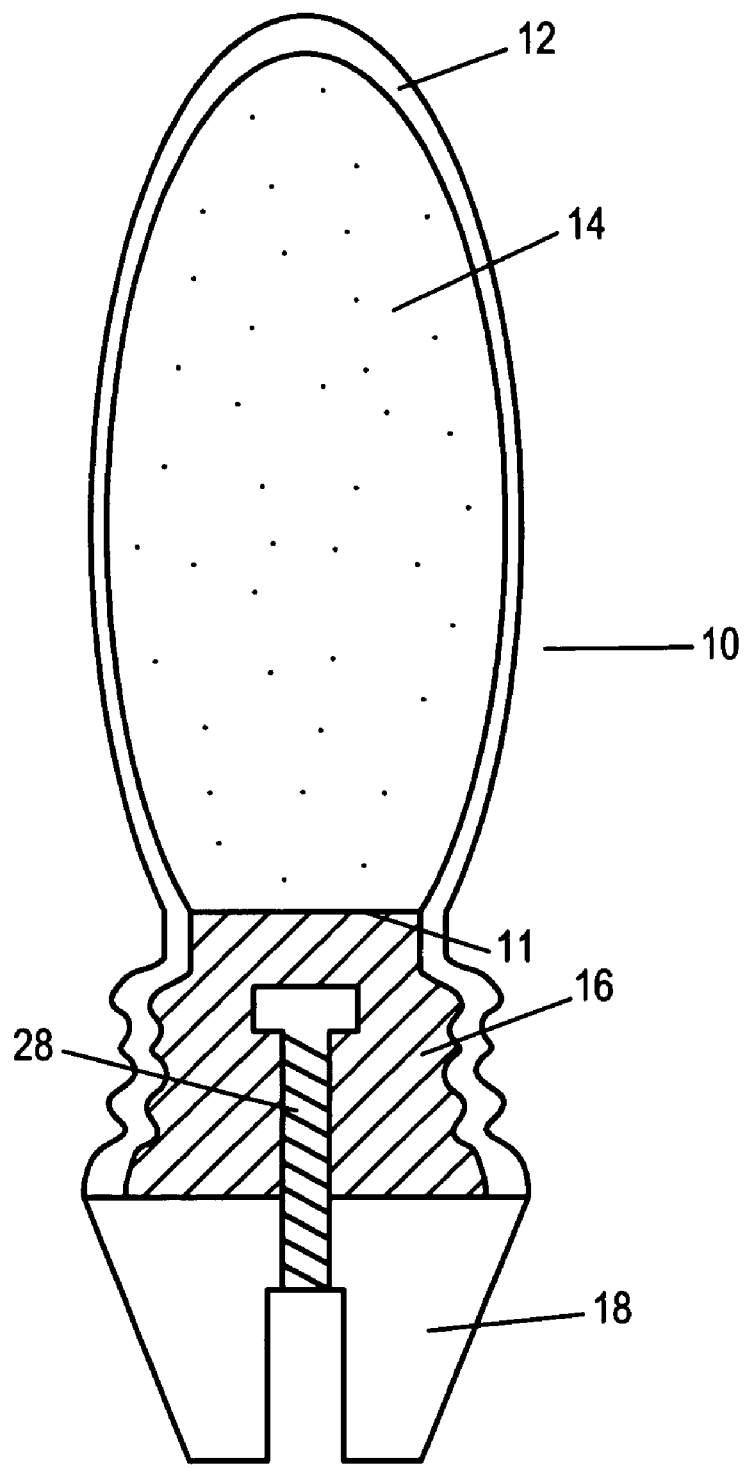
FIG. 2 is a centerline cross sectional view of a safety tap handle according to the invention.

FIG. 2 is a centerline cross sectional view of a tap handle 10 according to the invention. The shell 12 is optimally 2-3 mm thick but may be of any thickness up to 12 mm (0.472"), at which point firing and annealing becomes impractical. Ideally, the foam 14 fills approximately 90% of the interior of the shell 12. The foam 14 is sealed by a glue plug 16, which also adheres to the interior surface of the shell 12 and a metal ferrule 18.

The ferrule 18 is preferably steel, annular in shape, and is internally threaded to receive the externally threaded handle stud 26 (not shown), which extends from the tap (not shown). Variant ferrules 18 may be employed. In one variation, the ferrule 18 is secured to the shell 12 by a bolt (not shown), which extends longitudinally along the centerline of the shell 12 and extends out the top of the shell 12 through a small hole. A nut or finial (not shown) is then secured to the end of the bolt and tightened against the top of the shell 12. The foam 14 is injected about the longitudinal bolt (not shown). The sizing is standard in the industry to facilitate interchangeability of tap handles. In this variation, a cap 20 is not employed. The ferrule 18 is typically an inverted frustro-conical shape, with sides flush to the exterior surface of the shell 12 and a diameter that diminishes towards to tap 24. In an additional variation, the ferrule 18 includes an anchor bolt 28 extending vertically from its top surface. The anchor bolt 28 is enveloped by the glue plug 16 and once hardened, anchors the shell 12 and foam 14 to the ferrule 18. The anchor bolt 28 may also extend into the foam 14.

It should be understood that the above description is intended for illustrative purposes only, and is not intended to limit the scope of the present invention in any way. Those skilled in the art will appreciate that various modifications can be made to the embodiments discussed above without departing from the spirit of the present invention.

What is claimed is:

1. An improved tap handle for use with a beverage dispensing apparatus comprising:
   (a) a hollow shell having at least one open end;
   (b) a hardened foam disposed within said shell; and
   (c) said foam adheres to and reinforces said shell;
   wherein said shell has a porous interior surface and said foam adheres to said porous interior surface.

2. A tap handle according to claim 1, wherein said shell is comprised, at least in part, of ceramic material.

3. A tap handle according to claim 2, wherein said ceramic material is stoneware.

4. A tap handle according to claim 2, wherein said ceramic material is porcelain.

5. A tap handle according to claim 1, wherein said shell is comprised, at least in part, of plastic.

6. A tap handle according to claim 1, wherein said shell is comprised, at least in part, of resin.

7. A tap handle according to claim 1, wherein said shell is comprised, at least in part, of wood.

8. A tap handle according to claim 1 additionally comprising a layer of glue or epoxy disposed inside said shell proximate to an open end between said foam and said open end.

9. A tap handle according to claim 8 additionally comprising an annular ferrule having internal threads and a top and bottom and being disposed in said interior of said shell, said bottom abutting said glue or epoxy.

10. A tap handle according to claim 1 wherein said foam is polyurethane foam.

11. A tap handle according to claim 1 wherein said foam is polymeric diphenylmethane diisocyanate foam.

12. A tap handle according to claim 1, wherein said shell has an interior surface and said foam adheres to said interior surface.

13. An improved tap handle for use with a beverage dispensing apparatus comprising:
   (a) a hollow shell having at least one open end;
   (b) a hardened foam disposed within said shell;
   (c) said foam adheres to and reinforces said shell; and
   (d) a layer of glue or epoxy disposed inside said shell proximate to an open end between said foam and said open end.

14. A tap handle according to claim 13, wherein said shell is comprised, at least in part, of ceramic material.

15. A tap handle according to claim 14, wherein said ceramic material is stoneware.

16. A tap handle according to claim 14, wherein said ceramic material is porcelain.

17. A tap handle according to claim 13, wherein said shell is comprised, at least in part, of plastic.

18. A tap handle according to claim 13, wherein said shell is comprised, at least in part, of resin.

19. A tap handle according to claim 13, wherein said shell is comprised, at least in part, of wood.

20. A tap handle according to claim 13 additionally comprising an annular ferrule having internal threads and a top and bottom and being disposed in said interior of said shell, said bottom abutting said glue or epoxy.

21. A tap handle according to claim 13 wherein said foam is polyurethane foam.

22. A tap handle according to claim 13 wherein said foam is polymeric diphenylmethane diisocyanate foam.

23. A tap handle according to claim 13, wherein said shell has an interior surface and said foam adheres to said interior surface.

* * * * *